(12) United States Patent
Phadke

(10) Patent No.: US 9,787,175 B2
(45) Date of Patent: Oct. 10, 2017

(54) HIGH VOLTAGE POWER CONVERTER WITH A CONFIGURABLE INPUT

(71) Applicant: Astec International Limited, Kowloon (HK)

(72) Inventor: Vijay Gangadhar Phadke, Pasig (PH)

(73) Assignee: ASTEC INTERNATIONAL LIMITED, Kowloon (HK)

(*) Notice: Subject to any disclaimer, the term of this patent is extended or adjusted under 35 U.S.C. 154(b) by 133 days.

(21) Appl. No.: 14/512,084

(22) Filed: Oct. 10, 2014

(65) Prior Publication Data

US 2016/0043633 A1 Feb. 11, 2016

Related U.S. Application Data

(60) Provisional application No. 62/034,602, filed on Aug. 7, 2014.

(51) Int. Cl.
| | |
|---|---|
| *H02J 1/10* | (2006.01) |
| *H02M 1/42* | (2007.01) |
| *H02M 1/10* | (2006.01) |
| *H02M 3/28* | (2006.01) |
| *H02M 3/335* | (2006.01) |
| *H02M 1/00* | (2006.01) |

(52) U.S. Cl.
CPC .......... *H02M 1/4216* (2013.01); *H02M 1/10* (2013.01); *H02M 1/4225* (2013.01); *H02M 3/285* (2013.01); *H02M 3/33538* (2013.01); *H02M 2001/007* (2013.01); *H02M 2001/0064* (2013.01); *Y02B 70/126* (2013.01)

(58) Field of Classification Search
CPC .... H02M 1/4216; H02M 1/10; H02M 1/4225; H02M 2001/007; H02M 3/285; H02M 2001/0064; H02M 3/33538; H02M 3/1584; H02M 7/08; H02M 7/153; H02M 7/17; H02M 7/23; H02M 1/088; H02M 1/096; H02M 2001/0074; H02M 2001/0083; Y02B 70/126
USPC .... 323/207, 266, 268, 271, 272; 363/44–48, 363/52–53, 65–67, 69, 70, 84, 86, 125
See application file for complete search history.

(56) References Cited

U.S. PATENT DOCUMENTS

| | | | | |
|---|---|---|---|---|
| 5,250,775 | A * | 10/1993 | Maehara | H02J 3/32 307/72 |
| 5,824,990 | A | 10/1998 | Geissler et al. | |
| 6,269,015 | B1 * | 7/2001 | Ikeda | B23K 9/091 363/142 |
| 6,671,194 | B2 * | 12/2003 | Takahashi | H02M 1/36 363/65 |
| 7,457,139 | B2 * | 11/2008 | Isii | B23K 9/0956 219/130.32 |
| 8,289,741 | B2 | 10/2012 | Jungreis | |

(Continued)

*Primary Examiner* — Alex Torres-Rivera
(74) *Attorney, Agent, or Firm* — Harness, Dickey & Pierce, P.L.C.

(57) ABSTRACT

A high voltage power converter has first, second, and third switches for receiving an alternating-current input. A control power factor correction (PFC) rail is connected to each of the first, second, and third switches. A slave PFC rail is connected to each of the first, second, and third switches for providing a substantially identical output compared to an output of the control PFC rail. The control PFC rail output and the slave PFC rail output are each connected to an output stage and the output stage is for connection to a load.

22 Claims, 8 Drawing Sheets

(56) References Cited

U.S. PATENT DOCUMENTS

Figure 1:
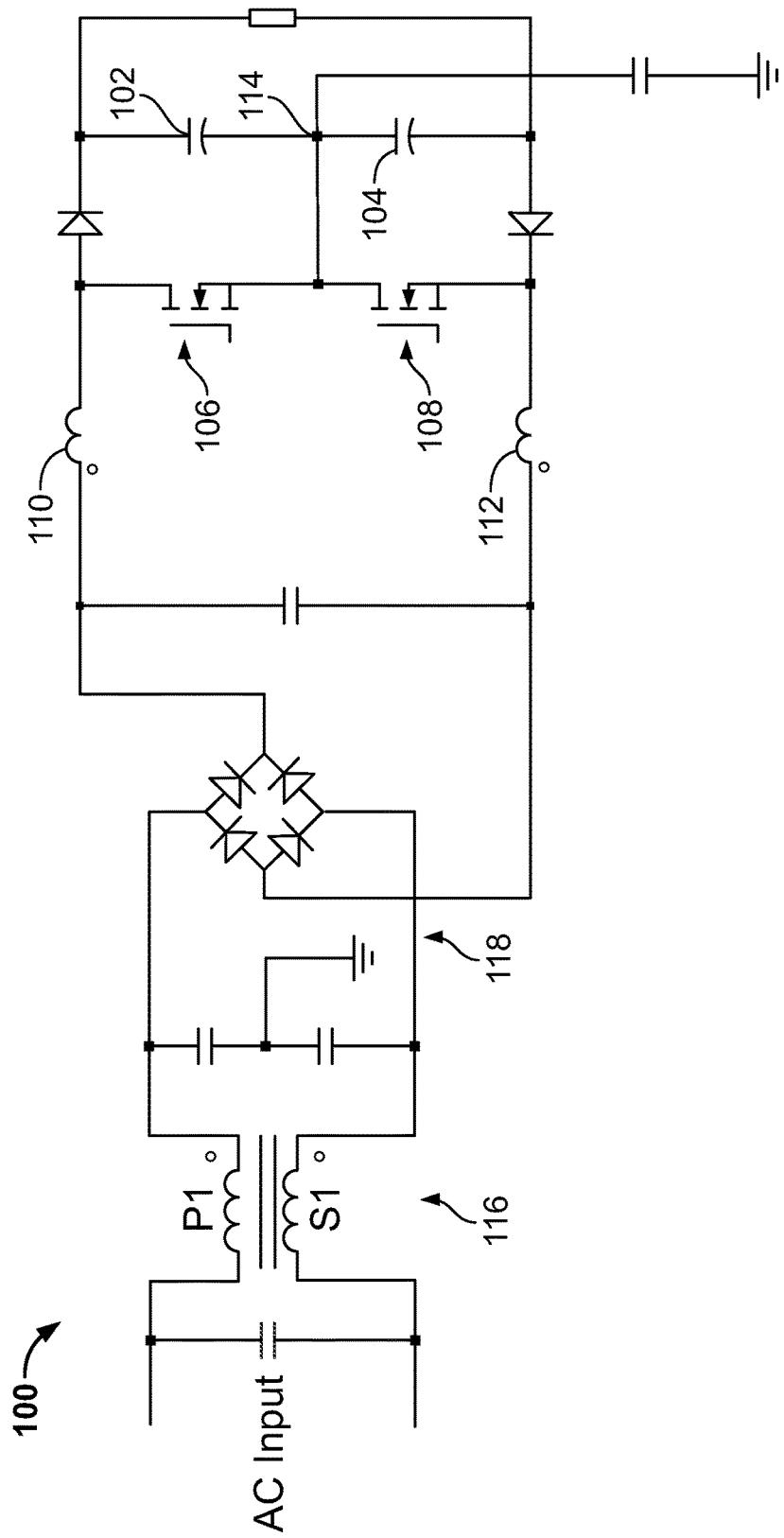

| | | | | |
|---|---|---|---|---|
| 8,374,011 | B2* | 2/2013 | Wirth | H02M 7/49 363/125 |
| 2010/0097041 | A1* | 4/2010 | Ayukawa | H02M 1/4225 323/272 |
| 2010/0165679 | A1* | 7/2010 | Lu | H02M 1/4225 363/89 |
| 2011/0149622 | A1* | 6/2011 | Lin | H02M 1/4208 363/124 |
| 2011/0235379 | A1* | 9/2011 | Siri | H02M 7/08 363/125 |
| 2014/0368741 | A1* | 12/2014 | Joo | H02M 1/32 348/730 |
| 2015/0029761 | A1* | 1/2015 | Trinh | H02M 1/36 363/17 |
| 2015/0365003 | A1* | 12/2015 | Sadwick | H02M 3/28 363/21.01 |

\* cited by examiner

HIGH VOLTAGE POWER CONVERTER WITH A CONFIGURABLE INPUT

CROSS-REFERENCE TO RELATED APPLICATION

This application claims the benefit of U.S. Provisional Application No. 62/034,602 filed Aug. 7, 2014. The entire disclosure of the above application is incorporated herein by reference.

FIELD

The present disclosure relates to high voltage power converters. More particularly, the present disclosure relates to single or multi-phase power converters with a configurable input to accommodate a wide range of alternating-current (AC) or direct-current (DC) power input.

BACKGROUND

This section provides background information related to the present disclosure which is not necessarily prior art.

Equipment operated at very high output power levels (e.g. >3 kilowatts (KW)) typically uses high voltage input feeds, for maintaining current drawn from an AC utility power-line at practical levels. The utility power-lines typically have a 230 volt (V) 3-phase input or 380V, 400V, 415V, or 480V 3-phase input, depending on the application and the geographic location. Certain applications may also operate on a single-phase but with a preferred high input voltage of 200V or more.

Known high voltage power converters are typically designed for a particular input voltage and do not accommodate a wide range of input voltages. This results in multiple product designs and manufacturing versions to accommodate the many different input voltages required around the world. The need for these multiple product configurations increases development costs, increases inventory parts requirements, and complicates the calculus for determining the inventory requirements for finished products.

Further, most 3-phase power factor correction topologies were originally designed and developed for motor control applications that inherently have undesirable high frequency swinging voltage nodes with respect to earth-ground. The swinging nodes cause unacceptably high common mode noise making operation at the higher frequencies demanded by many current applications difficult. For example, most 3-phase power factor correction (PFC) topologies, including a Vienna Rectifier, have a high voltage bus that swings, with respect to earth, at a rate of the switching frequency. This voltage swinging is a major source of common mode emissions where the common mode currents get coupled to earth through a direct-current to direct-current (DC-DC) converter transformer's parasitic capacitance. This makes it very difficult to manage electromagnetic interference (EMI); ultimately requiring a reduced switching frequency and/or use of a bulky EMI filter.

Some designers prefer to use three independent single phase AC-DC converters connected in parallel at the output with a current sharing mechanism. Such designs use traditional single phase PFC topologies which deliver excellent harmonic rejections, high PFC, and a stable DC link bus. This approach reduces design complexity by using simple, proven design blocks. However, each AC-DC converter may need to operate with a 480V±10% AC input feed requiring a PFC boost converter to deliver an 800V DC link. Using known boost PFC approaches requires a boost switch and diode rating of more than 1000V, which are expensive compared to more common lower voltage switches and diodes. If the expensive 1000V devices are not used, either the converter performance will be compromised or a more complex converter design using high-performance 600V devices is needed. In addition, if the converters are needed to accommodate a 230V, Delta 3-phase input and a 380V-480V, Delta 3-phase input, the design is further complicated by the wide voltage range needs. It is well known that boosting over a large range deteriorates a converter's efficiency and significantly increases the manufacturing cost of the power converter. Such wide voltage range power supplies are employed for some products that can accept the increased cost and efficiency penalty. For example, user of mobile electronic devices, such as cell phones or notebook computers may travel across the globe requiring the devices' chargers and power sources to be compatible with world-wide utility feeds.

One known 3-phase delta input power supply uses three independent single phase, isolated power supplies, each having its own PFC and DC-DC converter block connected in parallel at output and deploying active or passive current sharing. One known single phase rail, shown at FIG. 1, uses inexpensive, high performance 600V devices and generates a boosted 800V DC link bus.

As seen in FIG. 1, a PFC converter 100 has a split DC link generating, for example 800V, with each capacitor, 102, 104 sharing 400V each. The boost switches 106, 108 are typically driven by identical signals through an appropriate isolation drive circuit. If the inductors 110, 112 do not have an exactly equal inductance value, the center node 114 voltage will vary from a center point of the input signal but still be at a fixed reference. However, this is possible only in ideal conditions when the two switches 106, 108 are turning on and off at the same time and at the same speed. The rise and fall of voltage across the two switches must be identical. In practice, the drive signals for the two switches are different due to variations in the switches' gate threshold, drive signal imbalance, layout parasitics, etc. Thus, because the two switches do not turn on and off at the same time, in a synchronized manner, the center node 114 voltage swings at every high frequency switching cycle. The extent of swing depends on the extent of variation in delays and the difference in rise and fall times of the two switches. The common mode EMI performance typically varies from unit-to-unit and is affected by temperature variations impacting the gate threshold of the two switches. Also this configuration does not allow use of a common core inductor for 110, 112. Further, if the variation in delays and switching times are large, the voltage on the two series bulk capacitors 102,104 will not be identical, requiring a special control scheme. Power converter 100 also includes an EMI filter shown generally at 116 and a bridge rectifier shown generally at 118.

Figure 2:
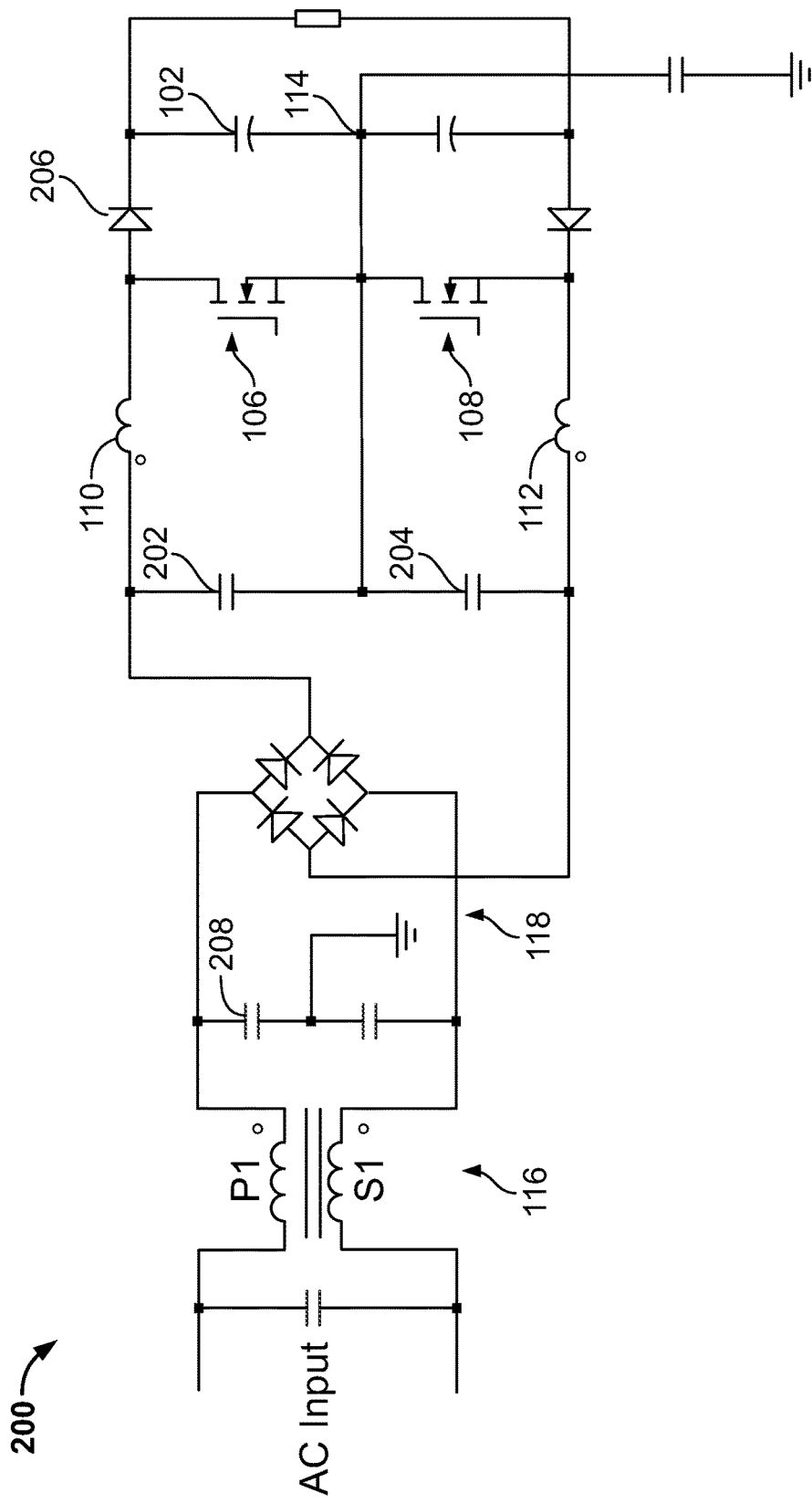

The design of FIG. 1 is marginally improved using a pair of input splitting capacitors to reduce the swinging center node of the bulk capacitors, as shown in FIG. 2.

The control methodology for power converter 200 of FIG. 2 is essentially the same as described above, with respect to FIG. 1. If there is a short delay between the switching of 106, 108, the splitting capacitors 202, 204 maintain center node 114 at a fixed DC or low frequency level. Assuming that 106 turns off slightly before 108, inductor 110 starts freewheeling through diode 206, capacitor 102, switch 108, and inductor 112. Since 108 is still on, the current in inductor 112 continues to ramp by drawing current from capacitor 204 until 108 turns off. Due to a charge on capacitor 208, there is minimal swing at the center node 114. Similar action occurs when 106 turns on before 108. Current from 202 is drawn to ramp the current in 110. However, if there is a variation in switching times, the effective high frequency stability of center node 114 depends on the stiffness of the voltage across 202 and 204. The value of capacitors 202, 204 is dictated by the level of PFC needed. Very high values of 202, 204 deteriorate the displacement factor; while low values are subject to common mode EMI issues. Also, the power converter 200 does not allow use of a common core inductor for 110, 112 because of high frequency ringing caused by the leakage inductance of the coupled choke and capacitors 202, 204.

SUMMARY

This section provides a general summary of the disclosure, and is not a comprehensive disclosure of its full scope or all of its features.

According to one aspect of the present disclosure a high voltage power converter has first, second, and third switches for receiving an alternating-current (AC) input. A control power factor correction (PFC) rail is connected to each of the first, second, and third switches. A slave PFC rail is connected to each of the first, second, and third switches for providing a substantially identical output compared to an output of the control PFC rail. The control PFC rail output and the slave PFC rail output are each connected to an output stage and the output stage is for connection to a load.

According to another aspect of the present disclosure a high voltage power converter has first, second, and third switches. A control power stage for receiving an alternating-current (AC) input is connected to each of the first, second, and third switches. A control power factor correction (PFC) converter is connected to the control power stage. A control direct-current to direct-current (DC-DC) converter is connected to the control PFC converter. The control power stage, the control PFC converter, and the control DC-DC converter collectively form a control PFC rail wherein an AC signal and a DC feedback signal for controlling the high voltage converter are taken from the control PFC rail. A slave power stage for receiving an AC input is connected to each of the first, second, and third switches. A slave PFC converter is connected to the slave power stage. A slave DC-DC converter is connected to the slave PFC converter. The slave power stage, the slave PFC converter, and the slave DC-DC converter collectively form a slave PFC rail for providing a substantially identical output compared to an output of the control PFC rail. A control output of the control DC-DC converter and a slave output of the slave DC-DC converter are each connected to an output stage and the output stage is for connection to a load.

According to another aspect of the present disclosure a high voltage power converter has first, second, and third switches for receiving a voltage input. A control voltage rail is connected to each of the first, second, and third switches. A slave voltage rail is connected to each of the first, second, and third switches for providing a substantially identical output compared to an output of the control voltage rail. The control voltage rail output and the slave voltage rail output are each connected to an output stage and the output stage is for connection to a load.

Some example embodiments of power supplies, power factor correction circuits, etc. incorporating one or more of these aspects are described below. Additional aspects and areas of applicability will become apparent from the description below. It should be understood that various aspects of this disclosure may be implemented individually or in combination with one or more other aspects. It should also be understood that the description and specific examples herein are provided for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3:
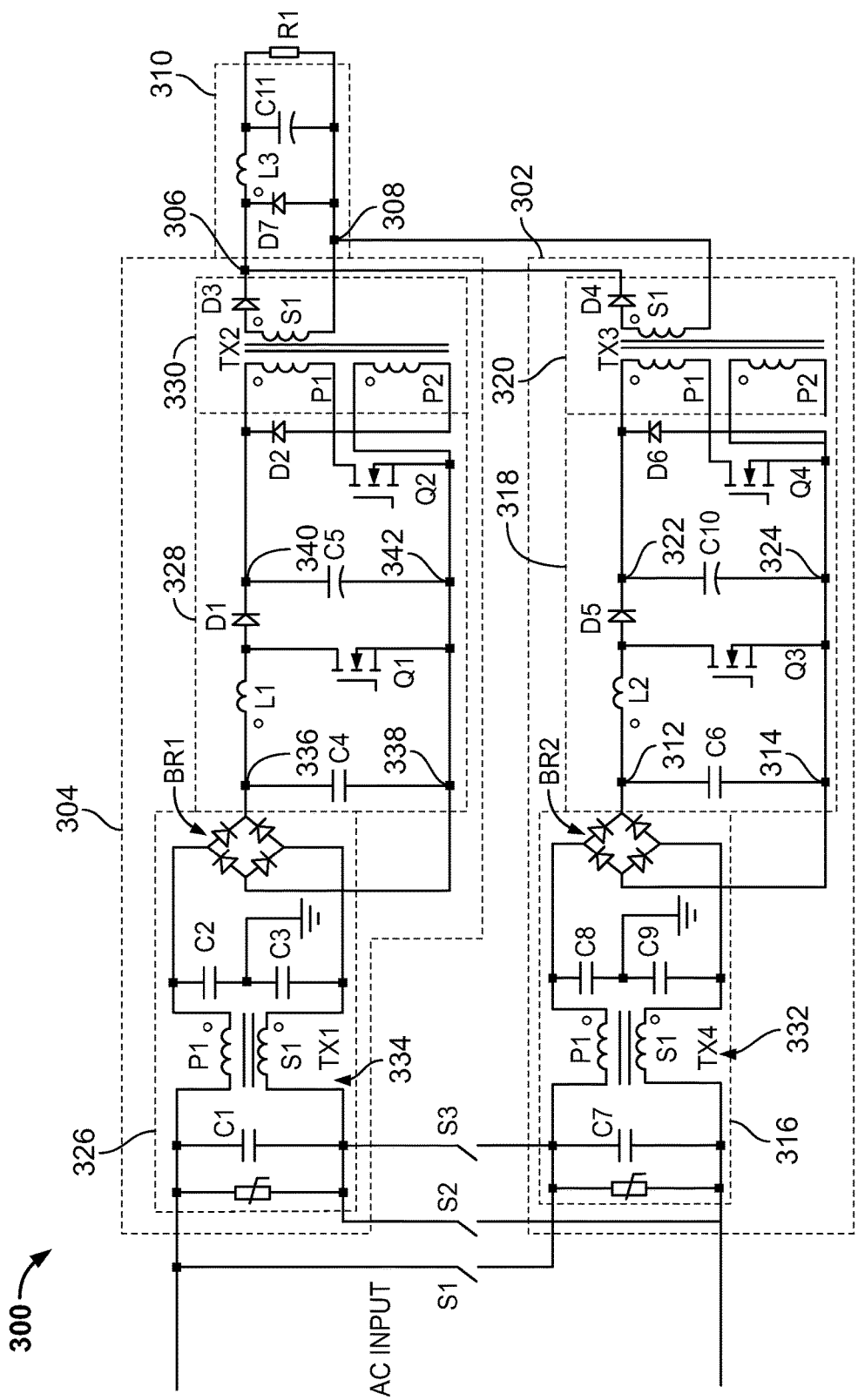
Figure 4:
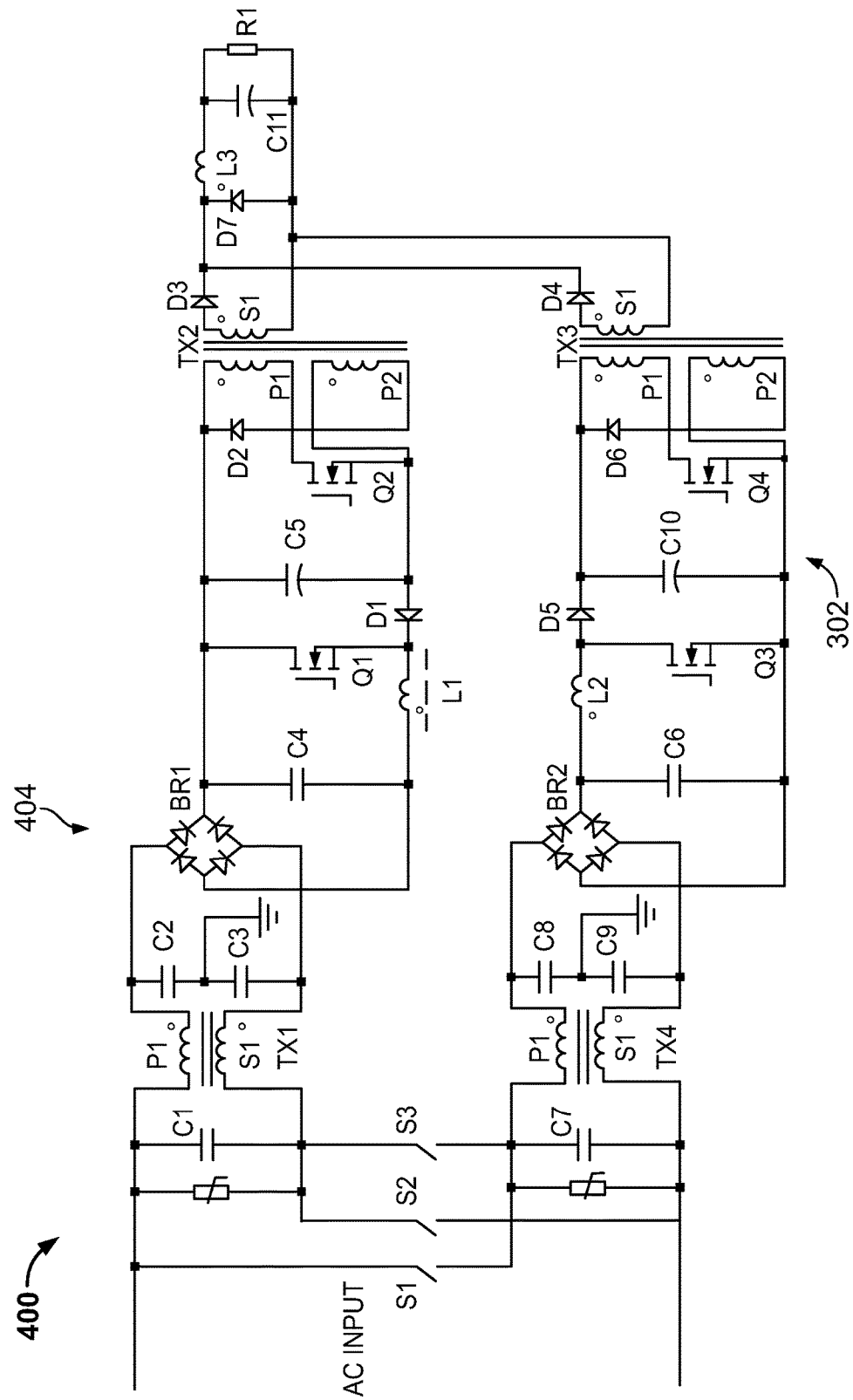
Figure 5:
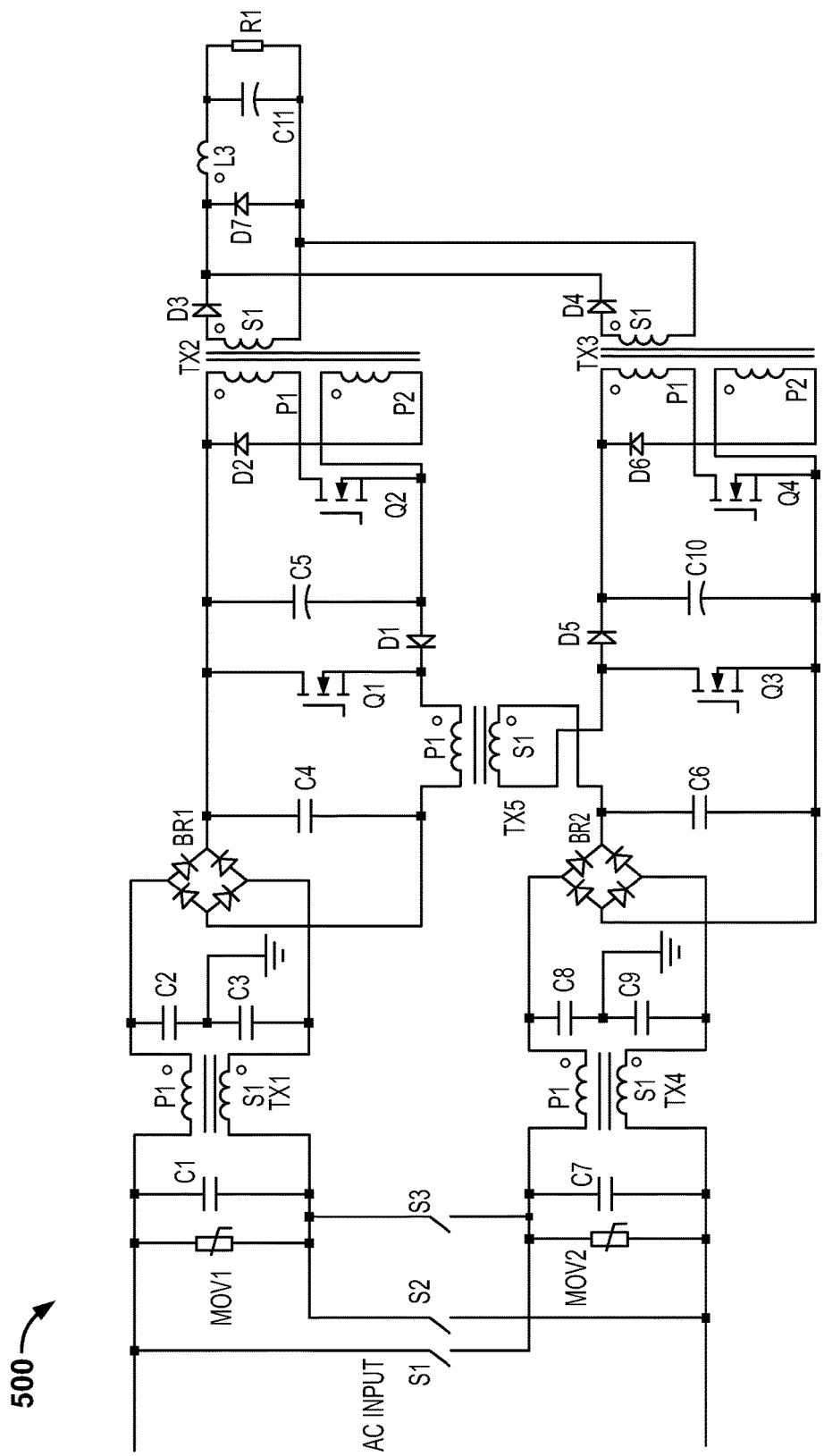
Figure 6A:
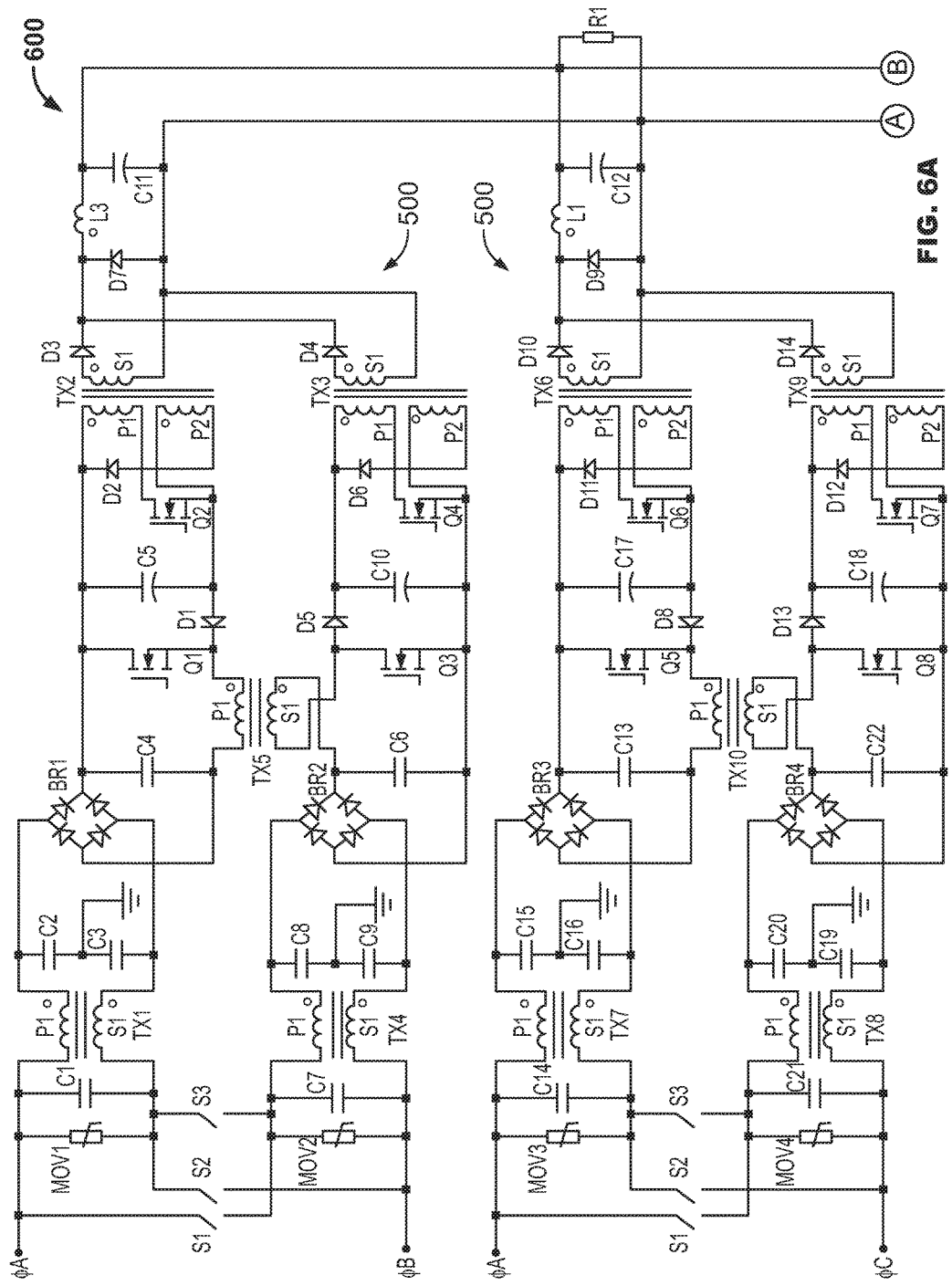
Figure 6B:
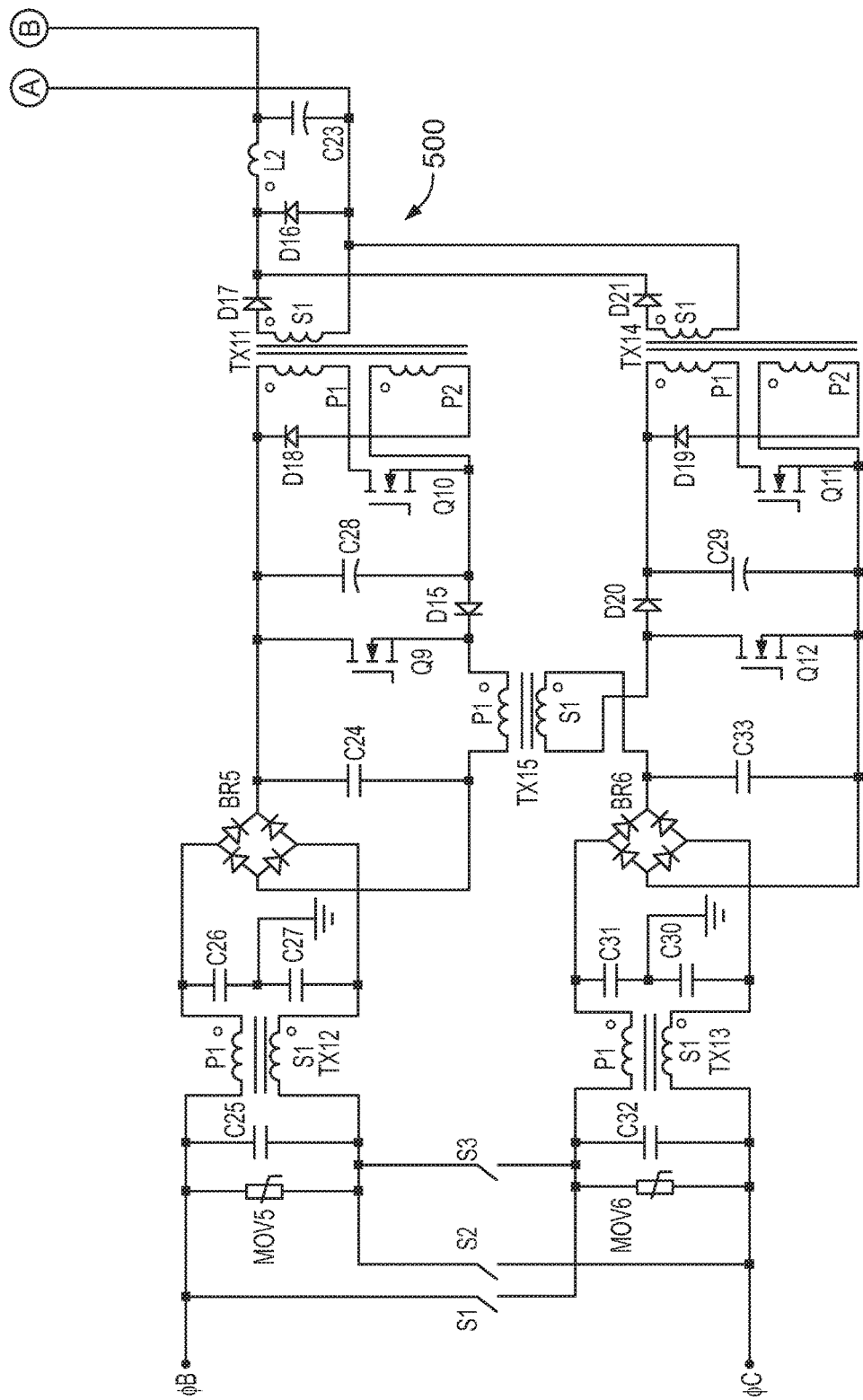
Figure 7:
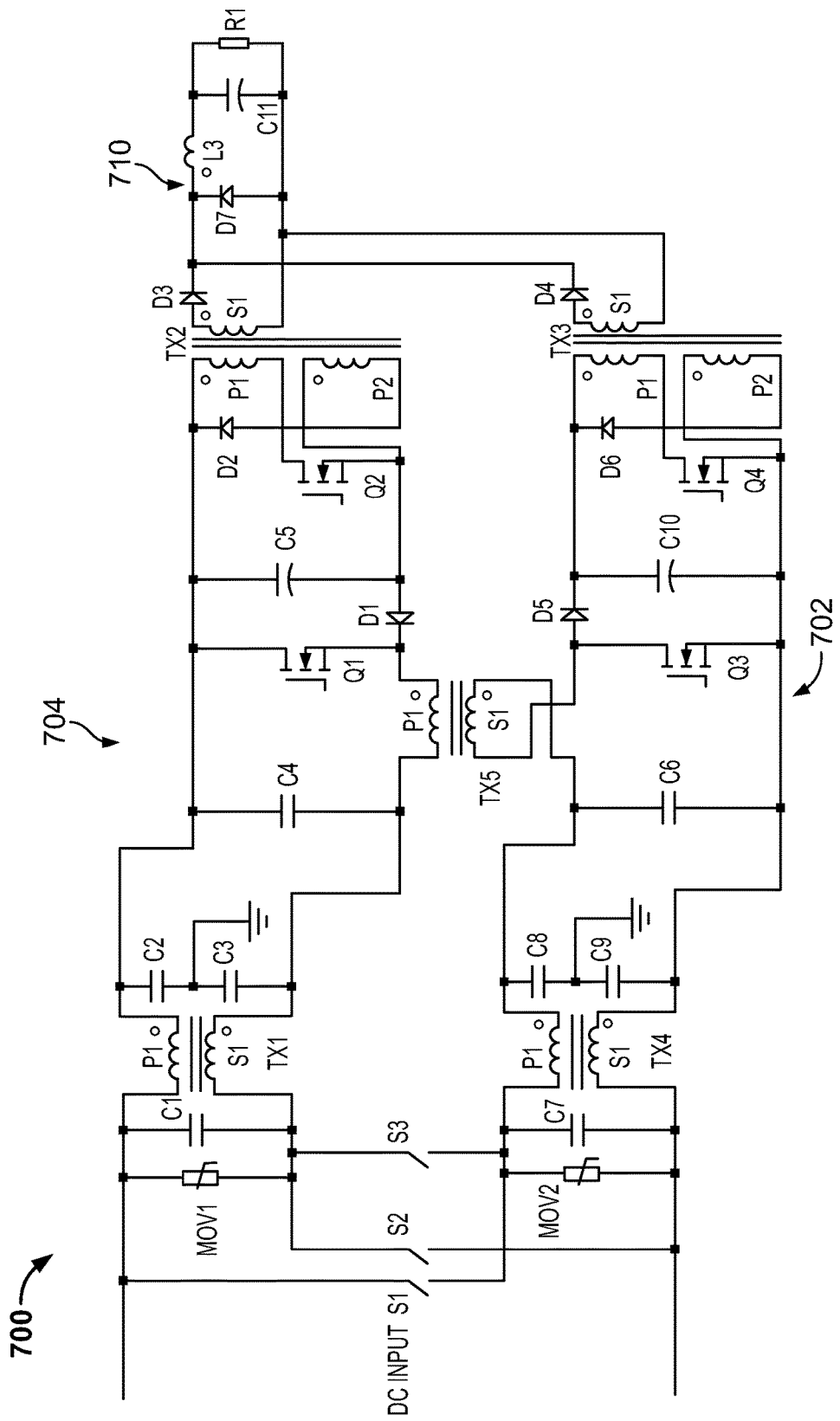

FIG. 1 is a prior art power converter;
FIG. 2 is another prior art power converter;
FIG. 3 is a power converter of one example of the present disclosure;
FIG. 4 is another example of a power converter of the present disclosure;
FIG. 5 is yet another example of a power converter of the present disclosure;
FIGS. 6A and 6B are a 3-phase power converter example including three single phase power converters of FIG. 5; and
FIG. 7 is still another example of a power converter of the present disclosure.

Corresponding reference numerals indicate corresponding parts throughout the several views of the drawings.

DETAILED DESCRIPTION

Examples will now be described more fully with reference to the accompanying drawings.

The examples disclosed below demonstrate how to construct a high performance, high voltage AC-DC converter having a flat efficiency over a wide input voltage range via a switch configuration at the AC input. A 3-phase construction using three high voltage power converters is also disclosed.

The examples disclose a power supply that may operate over a range of 180 VAC to 528 VAC encompassing phase to phase voltages of AC feeds for worldwide utility voltages such as 200V, 220V, 230V, 240V, 380V, 400V, 440V, and 480V. This entire input voltage range is accommodated by dividing the possible line voltage range into two sub-ranges, 170V to 265V and 340V to 530V. A desired sub-range is selected for a given application as a fixed hard-wired installation, typically done by qualified service personnel.

The examples are derived from a base structure having a boost PFC front-end and a DC-DC converter back-end. It is noted that the circuits and circuit blocks disclosed are examples for understanding the concepts and several other design topologies may be used, depending on the design criteria and application, as will be understood by those skilled in the art.

The base structure may have a power stage with an EMI filter, a bridge rectifier, a boost PFC converter with a control scheme achieving high power factor correction and harmonic correction, and a DC-DC converter. The figures below, for clarity and simplicity, do not show all of the circuit components required to implement the high voltage power converter. For example, as those skilled will appreciate, the DC-DC converter circuits shown do not include the secondary side elements. The base structure is known and may, for example, be designed for an AC input range of 170V to 265V, as done in known AC-DC power supplies. A typical boosted DC output voltage for the base structure may be, for example, about 400 VDC. It is well known that this example design may use a 600V rated switch and rectifiers for the boost front-end and the voltage rating of the DC-DC converter components depend upon the chosen architecture, as is well understood. The voltage ratings of the bridge rectifier, other circuit elements such as the EMI filter, an output capacitor, etc. may be the same as any known 230V design. The base structure allows the use of low cost, high performance industry standard components.

The example of FIG. 3 shows a high voltage power converter 300. First, second, and third switches S1, S2, and S3 respectively are for receiving an alternating-current (AC) input, as indicated. A control power factor correction (PFC) rail at dashed line 302 is connected to each of the first, second, and third switches S1-S3. A slave PFC rail at dashed line 304 is also connected to each of the first, second, and third switches S1-S3 for providing a substantially identical output at nodes 306, 308 compared to an output at nodes 306, 308 of the control PFC rail 302. The control PFC rail 302 output and the slave PFC rail 304 output are each connected to an output stage 310 and the output stage 310 is for connection to a load R1, as shown. The output stage 310 of this example is a filter to attenuate high frequency components of the switching frequency of the DC-DC converters 320 and 330 to a desired level and is comprised of components D7, L3, and C11; however, output stage 310 could another type of circuit depending on the design specifications and application.

FIG. 3 shows a first example embodiment architecture. It is noted that control PFC rail 302 and slave PFC rail 304 are essentially identical and should be formed of components having matching specifications. The control and slave PFC rails 302, 304 are operated by a common control (not shown for clarity) where one rail is directly controlled while the other rail operates as a slave. The example describes the bottom rail 302 as the control rail, however the upper rail 304 could be chosen as the control rail.

In the example of FIG. 3, switches S1 and S2 are closed and switch S3 is open for use at a first voltage range, such as 170V-265V to be applied at the AC input. Described below is also an example where the first and second switches S1 and S2 are open and the third switch S3 is closed for use at a second voltage range, such as 340V-530 V to be applied at the AC input. Obviously, the first voltage range is lower than the second voltage range. Switches S1, S2, and S3 may be any appropriate switch-type, such as one of mechanical switches, relays, and wiring terminals. The switches may be accessible to service personnel to configure the converter 300 for the appropriate input voltage range, through hard connections using a terminal block or any other suitable arrangement.

Either PFC rail 302 or 304 may be chosen for control and regulation. In the FIG. 3 example, the lower PFC rail 302 is the control PFC rail and BR2, L2, Q3 and D5 are used for obtaining signals for controlling high voltage converter 300. Closed switches S1 and S2 connect the two PFC rails 302, 304 in parallel at the AC input and both PFC rails receive same AC input voltage.

The control PFC rail 302 includes a control power stage, indicated at dashed box 316. Control power stage 316 is connected to each of the first, second, and third switches S1-S3. The control PFC rail 302 further includes a control PFC converter, indicated at dashed box 318, connected to the control power stage 316. The control PFC rail 302 also includes a control direct-current to direct-current (DC-DC) converter, indicated at dashed box 320, connected to the control PFC converter 318. The control DC-DC converter 320 includes transformer TX3 and diode D4, connected as shown.

The slave PFC rail 304 matches the control PFC rail 302 and includes a slave power stage, indicated at dashed box 326. Slave power stage 326 is connected to each of the first, second, and third switches S1-S3. The slave PFC rail 304 further includes a slave PFC converter, indicated at dashed box 328, connected to the slave power stage 326. The slave PFC rail 304 also includes a slave direct-current to direct-current (DC-DC) converter, indicated at dashed box 330, connected to the slave PFC converter 328. The slave DC-DC converter 330 includes transformer TX2 and diode D3, connected as shown. The slave PFC rail 304 provides a substantially identical output compared to an output of the control PFC rail 302.

Each of the control and slave power stages 316, 326 include a filter circuit and a rectifier circuit. The control power stage filter circuit, shown generally at 332, is an EMI filter and includes capacitors C7, C8, C9, and transformer TX4, as shown. The control power stage 316 rectifier circuit includes a bridge rectifier, as shown at BR2. The slave power stage filter circuit, shown generally at 334, is an EMI filter and includes capacitors C1, C2, C3, and transformer TX1, as shown. The slave power stage 326 rectifier circuit includes a bridge rectifier, as shown at BR1.

An alternating-current signal and a direct-current feedback signal for controlling the high voltage converter 300 are taken from the control PFC rail 302. In controlling high voltage power converter 300, the alternating-current signal is taken from BR2 nodes 312, 314 and the direct-current feedback signal is taken across an output capacitor, C10, of the control PFC converter 318, at nodes 322, 324. Each of the control and slave PFC converters 318, 328 are boost converters for achieving high power factor corrections and harmonic corrections of signals received from each of the respective control and slave power stages 316, 326. The control PFC converter 318 includes capacitors C6, C10, inductor L2, diodes D5, D6, and boost switches Q3, Q4, as shown. The slave PFC converter 328 includes capacitors C4, C5, inductor L1, diodes D1, D2, and boost switches Q1, Q2, as shown. Capacitors C6 and C4 are input capacitors for each of the control PFC converter 318 and the slave PFC converter 328, respectively. C6 has first and second leads connected at nodes 312 and 314 as shown. Similarly, C4 has first and second leads connected at nodes 336, 338, as shown. The slave PFC converter output capacitor C5 has first and second leads connected at nodes 340, 342, as shown.

A duty cycle commanded by the unshown PFC controller drives both boost switches Q1 and Q3. Since both PFC rails 302, 304 receive the same AC input voltage and are driven by essentially the same duty cycle, each PFC rail 302, 304 produces nearly the same voltages across the output capacitors C5 and C10. Thus, although lower PFC rail 302 is used for control, as explained above, the upper PFC rail 304 operates as a slave and provides essentially identical regulation performance.

Input current feedback is needed for harmonic correction and may be obtained through various well known means and is not shown for clarity. An input current feedback sensor signal is used in both PFC rails 302, 304 and each sensed signal is added before feeding to the unshown control circuit. Boost PFC control techniques are well known and thus such details are not given.

Generally, when in continuous conduction mode, an output voltage of a boost converter depends almost solely on input voltage and duty cycle. The value of any boost inductor and output capacitor has a negligible impact. However, it is possible that parasitic circuit variations in turn-on and turn-off delays and rise times of boost switches, drivers, buffers, etc. may result in slightly mismatched duty cycles between the two PFC rails 302, 304, despite being driven by essentially identical duty cycles. It is noted that both rails 302, 304 should use identical parts by design so that the only variation between the rails is due to parts tolerances and parasitic circuit variations. Because of the variations due to parts tolerances and parasitic variations, it is possible that an output voltage of the slave PFC rail 304 may be slightly higher or lower than the control PFC rail 302. To counter these mismatch issues, a circuit arrangement is used as shown, with the DC-DC converters 320, 330. FIG. 3 shows two identical forward converters connected to each PFC converters 318, 328. Both DC-DC converters 320, 330 are operated in parallel, by an identical drive signal. Thus, when the respective switches, Q4 and Q2 are turned on, the resultant secondary side voltages are connected in parallel through rectifier diodes D4 and D3 in an OR'ed-manner. In other words, only the relatively higher voltage between the two diodes D4 andD3 will deliver the current to the load R1 through the output inductor L3, while the other rectifier diode will be reverse biased. Thus, if the output voltages delivered by the two PFC rails 302, 304 are not equal, the PFC rail with the higher voltage delivers the load current through its respective DC-DC converter 320 or 330. The PFC rail delivering the load current then discharges its respective output capacitor C10 or C5. In addition, a voltage drop occurs in the series elements of the conducting PFC rail. A droop in the conducting PFC rail's output voltage then occurs, allowing the other PFC rail that initially had a slightly lower voltage to participate and deliver power. Thus, the output power is shared by the two PFC rails 302, 304 rails via a droop method. Since the two PFC rails 302, 304 are substantially identical and are in the same environment excepting minor tolerance and parasitic variations, the power sharing between the two PFC rails is essentially equal. The two DC-DC converters 320, 330 reflect the load resistance on the primary side, across their respective inputs from the PFC rail outputs. The PFC rail outputs are essentially identical and the two DC-DC converters force the voltage across the two bulk capacitors C5 and C10 to equalize.

Since each PFC rail 302, 304 is connected to the AC input feed through an identical bridge rectifier, no swinging nodes causing higher common mode emissions are created.

For an input range of about 340V to 530V range, in the example of FIG. 3, switches S1 and S2 are open and switch S3 is closed. This switch arrangement effectively puts the two PFC rails 302, 304 in series. Since all the components are substantially identical, the voltage stresses are halved for the components of each PFC rail compared to the stresses that would be experienced if only a single PFC rail were used.

The control for the 340V-530V range remains unchanged compared to 170V-265V low input range, as explained above. Only one PFC rail is used for AC input feedback and DC output feedback. It is also possible to use a current sensor (not shown) only for one PFC rail because the series PFC rail arrangement ensures that each PFC rail has an identical current. Thus, the control PFC rail (302 in this example) commands an essentially identical duty cycle drive for both PFC rails. As explained above, it is possible to have slightly unequal output voltages for the two PFC rail outputs, which is balanced due to the forced power sharing between the two DC-DC converters 318, 328, using natural droop. The rest of the circuit arrangement for the 340V-530V range remains unchanged compared to the previously described 170V-265V range and the circuit 300 operates as effectively at a lower input feed voltage range or a high input feed voltage range. The same low input voltage range boost choke values can be used for the higher input voltage range ensuring equal voltages are applied at the input of both PFC rails.

It is known to use powdered iron cores such as MPP (mollypermalloy powder), high flux, or sendust for continuous mode PFC operation. Such cores have very tight tolerances for inductance values. However, in a series configuration as explained above, if one inductor value of one PFC rail is higher than the corresponding counterpart inductor in other PFC rail, the PFC rail with the higher inductor value will have a higher input voltage producing a higher output voltage. Although in continuous conduction mode the output is not dependent on the inductance value, the series connection of the two PFC rails split the AC input in two unequal parts. Thus, the PFC rail with a higher inductance will get a higher input voltage and cause a higher output voltage. The DC-DC converter arrangement, used in the FIG. 3 example, will force a balance between the two PFC rails by increasing the loading of the higher output voltage PFC rail causing a drop in the inductance value and hence providing automatic balance between the two PFC rails. This demonstrates that the effects of component variations between the two PFC rails are mitigated through the inherent balancing mechanisms of the examples disclosed.

In the high voltage input range, the lower PFC rail 302 has one end connected to the AC input feed through the bridge rectifier BR2. Thus, PFC rail 302 does not produce any significant swinging nodes that might cause higher common mode EMI. The upper PFC rail 304 is connected to a DC node created by the junction of the two input capacitors C4 and C6. If the values of C4, C6, and other capacitors used in EMI filtering are substantial, then this DC node will be quite steady, essentially eliminating common-mode EMI risk. If the values of these capacitors are low, then a small swing is possible and may cause a slight disturbance in EMI spectrum. This concern may be resolved using the power converter 400 of FIG. 4.

The power converter 400 of FIG. 4 is the same as the power converter 300 of FIG. 3, except that the position of the inductor L1 and diode D1 in the upper PFC rail 404 is changed compared to the upper PFC rail 304. If the control PFC converter input capacitor C6 has first and second leads (connected at nodes 312, 314 respectively), the slave PFC converter input capacitor C4 can be said to have first and second leads (connected at nodes 336, 338) corresponding to the control PFC converter capacitor first and second leads. In FIG. 4, the control boost inductor L2 of the control PFC converter is connected to the control PFC converter input capacitor first lead and the slave boost inductor L1 of the slave PFC converter is connected to the slave PFC converter input capacitor second lead. Similarly, the position of D1 is changed in FIG. 4 compared to FIG. 3.

If switches S1, S2 are closed and S3 is opened for low line operation, the operation of power converter 400 is identical to the power converter 300 of FIG. 3. If switches S1, S2 are open and S3 is closed for high line conditions, the operation of power converter 400 is improved compared to power converter 300. By simply changing the position of inductor L2 and diode D1 in the PFC rail 304, while keeping all other aspects of control identical, most potential common mode EMI concerns are eliminated. The power converter 400 has the top end of the upper rail 404 and the bottom end of the lower rail 302 connected to the AC input feed through the bridge rectifiers BR1 and BR2, providing a very steady reference. Any common mode voltage bump due to a variation in switching times of the two PFC rails 404 and 302 is now easily absorbed by the input capacitors C4, C6, which convert any common mode bump into a differential spike that is easily filtered by conventional, known techniques. Thus, any high voltage range common mode EMI concern is significantly reduced.

Essentially, the examples of FIGS. 3 and 4, provide near identical power delivery performance, with the FIG. 4 example providing better EMI suppression in worst case conditions. Still, as will be appreciated, a large enough variation in the inductance values can deteriorate the power sharing between the two PFC rails and dependency on the droop sharing between the DC-DC converters becomes higher.

The example of FIG. 5 removes the risk of too large a variation between L1 and L2 by ensuring that the values of the two inductors are equal through the use of coupled inductors wound on the same magnetic core.

The power converter 500 is the same as in FIG. 4, except that circuit 500 replaces inductors L1 and L2 with coupled inductors of transformer TX5 to ensure that there is an identical inductance value for both PFC rails. The power converter 500 has transformer TX5, such that the control boost inductor and the slave boost inductor are each formed from essentially identical windings on a common core.

For low AC input voltage conditions, switches S1, S2 are closed and S3 is open, in the same manner as described for the FIGS. 3 and 4 examples. The lower voltage line operation is not affected as the two PFC rails operate in parallel with the two inductor windings of TX5 also being in parallel.

For high AC input voltage conditions, switches S1, S2 are opened and S3 is closed. Because the two windings of TX5 are the same and both windings are on a single magnetic core and the two windings are used in two substantially identical PFC rails there will be little or no variation between the inductors of each PFC rail, thus ensuring virtually equal power sharing between the PFC rails and minimizing any droop sharing. The power converter 500 also minimizes the possibility of the two boost switches Q1, Q3 turning on and off at different times because opening one switch initiates freewheeling of the inductor in its corresponding PFC rail, while closing of both switches initiates the charging their respective inductors. As mentioned above, because the top and bottom nodes of the two serially connected PFC rails are connected to the AC input through bridge rectifiers BR1 and BR2, swinging nodes are eliminated and the DC output of each PFC rail has a steady potential with respect to the AC input. Thus, common mode EMI concern is greatly reduced or eliminated while ensuring near identical output voltages from the two PFC rails. Minor discrepancies between the PFC rails are handled by the natural droop current sharing achieved by circuit resistances and the DC-DC converter arrangements disclosed.

Those skilled in the art will appreciate that three high voltage power converters, such as disclosed in FIGS. 3-5, can be connected in one of a delta and a wye configuration for use in a 3-phase system. The three power converters may be connected in parallel at each power converter's output with each power converter connected between two phases of a delta or a wye 3-phase system. The combination will result in a 3-phase input AC-DC converter with high PFC, superior harmonics performance, and providing easy configurability for low or high input feed voltages. The versatility of such a 3-phase configuration allows a power supply manufacturer to develop, manufacture, and maintain a single design for a wide range of applications. The benefits of the above examples allow distributors and users to have an inventory of a single design and readily configure the product for varying worldwide applications. Those skilled in the art will appreciate that configuring a 3-phase power converter in accord with the disclosed examples to match the available 3-phase feed does not require access to any internal circuits. The configuration of the 3-phase power converter is easily done at the AC input wiring terminals. FIGS. 6A and 6B (collectively FIG. 6) show a 3-phase power converter 600, in a delta configuration, though a wye configuration is also possible. The FIG. 6 example shows three power converters 500 connected in a delta configuration. Depending on the input voltage ranges of a particular application the switches S1, S2, and S3 will be opened or closed, as described above.

The above examples have been shown with respect to AC inputs. The present disclosure is also useful and applicable with a DC input. FIG. 7 high voltage power converter 700 for use with multiple ranges of high voltage DC inputs. High voltage DC inputs may be encountered, for example, in solar applications where example voltage ranges may be 200V-350V or 400V-700V. Converter 700 is very similar to the power converter 500 of FIG. 5, except that the rectifier circuits BR1 and BR2 have been removed because the input is DC and rectification is not needed. The converter 700 also includes first, second, and third switches S1-S3 for receiving a voltage input. A control voltage rail 702, in this example, is connected to each of the first, second, and third switches S1-S3 in similar fashion to the AC examples above. A slave voltage rail 704 is connected to each of the first, second, and third switches S1-S3 for providing a substantially identical output compared to an output of the control voltage rail 702. The control voltage rail output and the slave voltage rail output are each connected to an output stage 710 and the output stage 710 is for connection to a load R1. The function of the control voltage rail 702 and the slave voltage rail 704 are essentially the same as the function of the rails described with respect to FIGS. 3-5. As with the previous examples described above, either voltage rail 702 or 704 of the converter 700 may be the control rail with the other rail serving as the slave. For a high DC voltage input, the three switches S1-S3 may be relays and the configuration of the switches may be automated by any known method. The converter 700 may have significantly improved overall efficiency compared to standard high voltage DC converters.

Thus there has been shown various DC-DC converters that may be operated in the same phase or in an interleaved manner through appropriate control. The examples disclosed provide a single design covering a wide input voltage range via input connection configurations saving design and manufacturing resources and making inventory and component parts management easier. The examples disclosed provide a flat efficiency at both low and high voltage applications. Further the examples disclosed, allow the use of a modular structure for 3-phase input power supplies eliminating common mode EMI issue experienced in most 3-phase boost PFC designs.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A high voltage power converter comprising:
   first, second, and third switches for receiving an alternating-current (AC) input;
   a control power factor correction (PFC) rail connected to each of the first, second, and third switches for receiving the AC input, the control PFC rail including a control power stage having an inductor;
   a slave PFC rail connected to each of the first, second, and third switches for receiving the AC input and providing an output substantially identical to an output of the control PFC rail, the slave PFC rail including a slave power stage having an inductor;
   wherein the first, second, and third switches are configurable to adapt the high voltage power converter for operating in a first inclusive input voltage range between 170 VAC and 265 VAC and a second inclusive input voltage range between 340 VAC and 530 VAC;
   wherein the inductor of the control power stage and the inductor of the slave power stage have a common core;
   wherein the control PFC rail output and the slave PFC rail output are each connected to an output stage; and
   wherein the output stage is for connection to a load.

2. The high voltage power converter of claim 1, wherein each of the first, second, and third switches are one of mechanical switches, relays, and wiring terminals.

3. The high voltage power converter of claim 1, wherein the high voltage power converter is adapted for operating in the first inclusive input voltage range when the first and second switches are closed and the third switch is open.

4. The high voltage power converter of claim 3, wherein the high voltage power converter is adapted for operating in the second inclusive input voltage range when the first and second switches are open and the third switch is closed.

5. The high voltage power converter of claim 1, wherein the control PFC rail includes:
   the control power stage connected to each of the first, second, and third switches;
   a control PFC converter connected to the control power stage; and
   a control direct-current to direct-current (DC-DC) converter connected to the control PFC converter.

6. The high voltage power converter of claim 5, wherein the slave PFC rail includes:
   the slave power stage connected to each of the first, second, and third switches;
   a slave PFC converter connected to the slave power stage; and
   a slave direct-current to direct-current (DC-DC) converter connected to the slave PFC converter.

7. The high voltage power converter of claim 6, wherein each of the control and slave power stages include a filter circuit and a rectifier circuit.

8. The high voltage power converter of claim 7, wherein the control PFC converter has an input capacitor having first and second leads and the slave PFC converter has an input capacitor having first and second leads corresponding to the control PFC converter capacitor first and second leads, wherein the inductor of the control power stage is a control boost inductor of the control PFC converter and the inductor of the slave power stage is a slave boost inductor of the slave PFC converter, and wherein the control boost inductor of the control PFC converter is connected to the control PFC converter input capacitor first lead and the slave boost inductor of the slave PFC converter is connected to the slave PFC converter input capacitor second lead.

9. The high voltage power converter of claim 6, wherein each of the control and the slave PFC converters are boost converters for achieving high power factor corrections and harmonic correction.

10. The high voltage power converter of claim 1, wherein each of the control and slave PFC rails include components having matching specifications.

11. A three phase system comprising a first high voltage power converter according to the high voltage power converter of claim 1, a second high voltage power converter according to the high voltage power converter of claim 1, and a third high voltage power converter according to the high voltage power converter of claim 1, wherein the first high voltage power converter, the second high voltage power converter, and the third high voltage power converter are connected in one of a delta and a wye configuration.

12. A high voltage power converter comprising:
first, second, and third switches for receiving an alternating-current (AC) input;
a control power stage connected to each of the first, second, and third switches to receive the AC input;
a control power factor correction (PFC) converter connected to the control power stage;
a control direct-current to direct-current (DC-DC) converter connected to the control PFC converter;
wherein the control power stage, the control PFC converter, and the control DC-DC converter collectively form a control PFC rail;
a slave power stage connected to each of the first, second, and third switches to receive the AC input;
a slave PFC converter connected to the slave power stage; and
a slave DC-DC converter connected to the slave PFC converter;
wherein the slave power stage, the slave PFC converter, and the slave DC-DC converter collectively form a slave PFC rail providing an output substantially identical to an output of the control PFC rail;
wherein the first, second, and third switches are configurable to adapt the high voltage power converter for operating in a first inclusive input voltage range between 170 VAC and 265 VAC and a second inclusive input voltage range between 340 VAC and 530 VAC;
wherein a control output of the control DC-DC converter and a slave output of the slave DC-DC converter are each connected to an output stage; and
wherein the output stage is for connection to a load.

13. The high voltage power converter of claim 12, wherein each of the first, second, and third switches are one of mechanical switches, relays, and wiring terminals.

14. The high voltage power converter of claim 12, wherein the high voltage power converter is adapted for operating in the first inclusive input voltage range when the first and second switches are closed and the third switch is open.

15. The high voltage power converter of claim 14, wherein the high voltage power converter is adapted for operating in the second inclusive input voltage range when the first and second switches are open and the third switch is closed.

16. The high voltage power converter of claim 12, wherein each of the control and slave power stages include a filter circuit and a rectifier circuit.

17. The high voltage power converter of claim 12, wherein each of the control and the slave PFC converters are boost converters for achieving high power factor corrections and harmonic correction and wherein the control PFC converter has an input capacitor and the slave PFC converter has an input capacitor and wherein a control boost inductor of the control PFC converter is connected to the control PFC converter input capacitor and a slave boost inductor of the slave PFC converter is connected to the slave PFC converter input capacitor.

18. The high voltage power converter of claim 17, wherein the control boost inductor and the slave boost inductor have a common core.

19. A high voltage power converter comprising:
an input for receiving a direct-current (DC) voltage;
first, second, and third switches coupled to the input;
a control voltage rail including a control power stage connected to each of the first, second, and third switches and a control direct-current to direct-current (DC-DC) converter connected to the control power stage; and
a slave voltage rail including a slave power stage connected to each of the first, second, and third switches and a slave DC-DC converter connected to the slave power stage;
wherein the first, second, and third switches are coupled between the input and the control power stage of the control voltage rail and between the input and the slave power stage of the slave voltage rail;
wherein the first, second, and third switches are configurable to adapt the high voltage power converter for operating in a first inclusive input voltage range between 200 VDC and 350 VDC and a second inclusive input voltage range between 400 VDC and 700 VDC;
wherein an output of the control voltage rail and an output of the slave voltage rail are each connected to an output stage; and
wherein the output stage is for connection to a load.

20. The high voltage power converter of claim 19, wherein the high voltage power converter is adapted for operating in the first inclusive input voltage range when the first and second switches are closed and the third switch is open.

21. The high voltage power converter of claim 20, wherein the high voltage power converter is adapted for operating in the second inclusive input voltage range when the first and second switches are open and the third switch is closed.

22. The high voltage power converter of claim 19, wherein the control voltage rail includes an inductor and the slave voltage rail includes an inductor and wherein the inductor of the control voltage rail and the inductor of the slave voltage rail have a common core.

* * * * *